Sept. 20, 1971     R. CAPGRAS     3,606,374
SELF-ADJUSTING HYDRO-PNEUMATIC SUSPENSION
Filed March 19, 1969     2 Sheets-Sheet 2
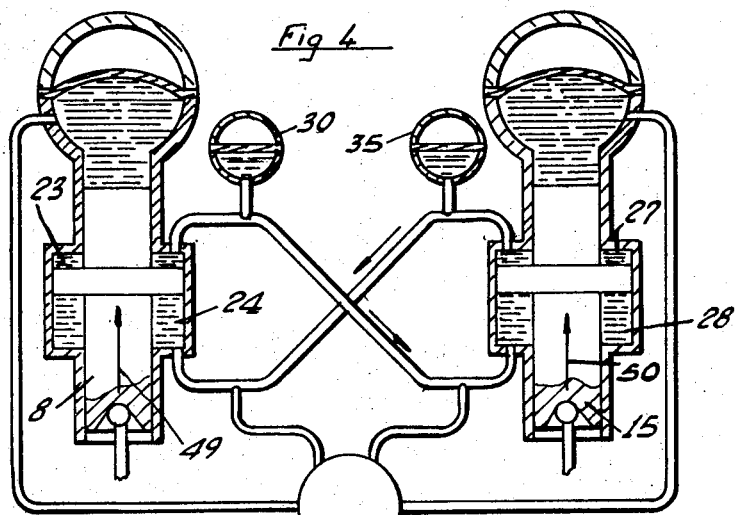
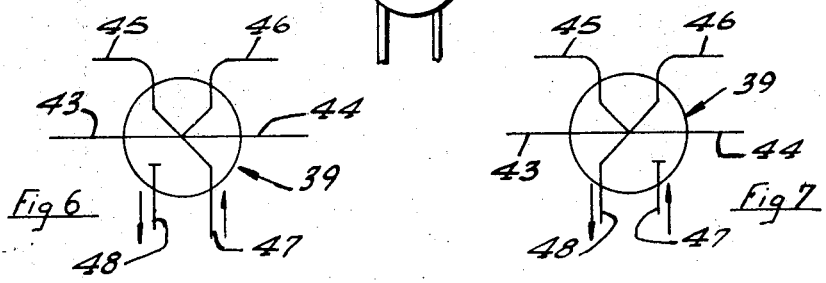
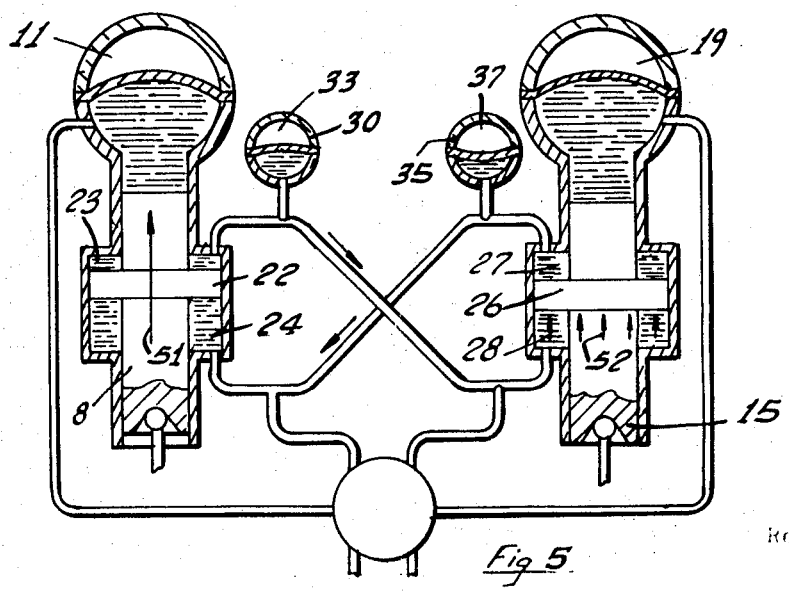
René CAPGRAS
INVENTOR
BY Karl F. Ross
ATTORNEY United States Patent Office 3,606,374
Patented Sept. 20, 1971

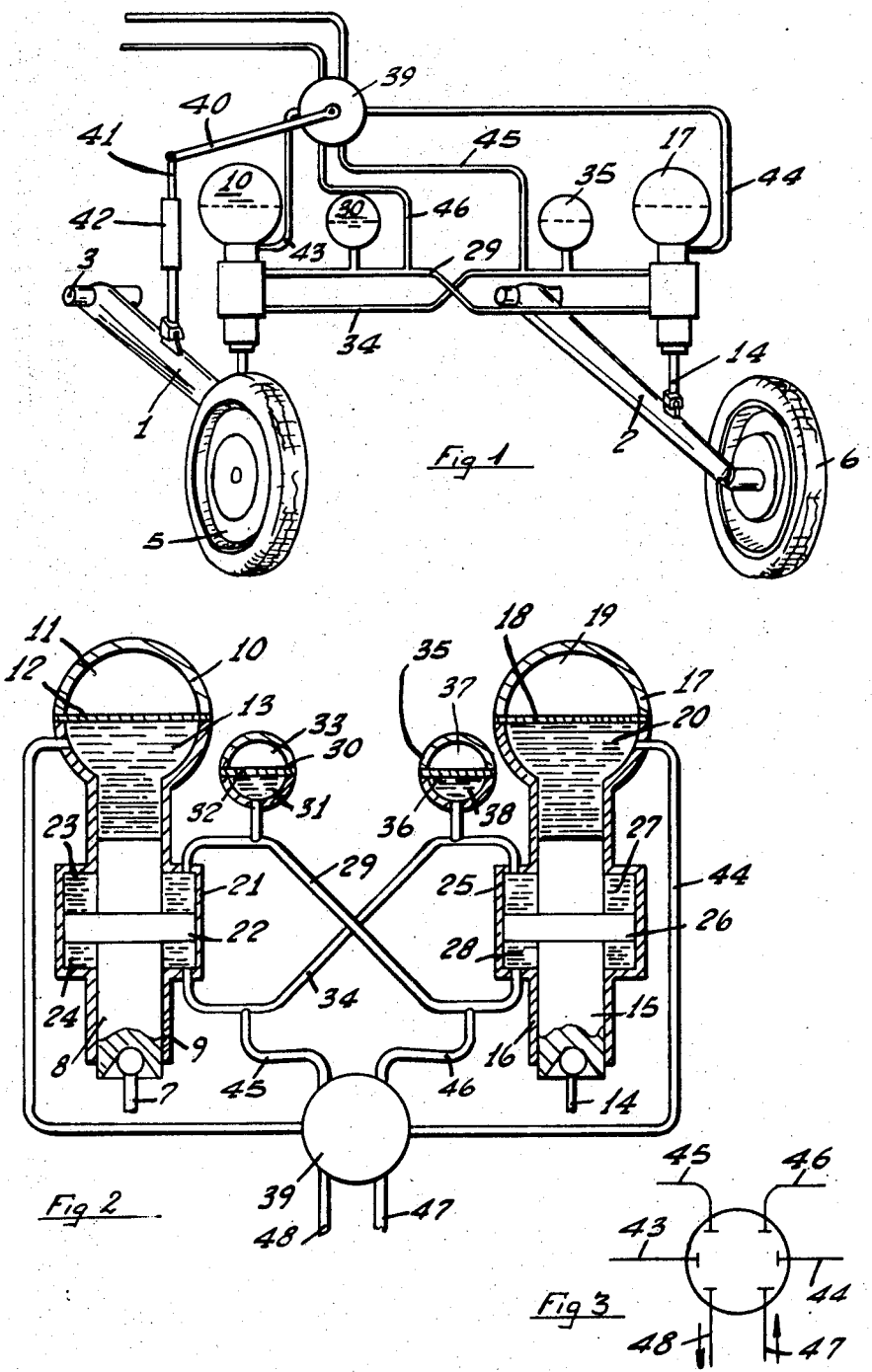

3,606,374
SELF-ADJUSTING HYDRO-PNEUMATIC SUSPENSION
Rene Capgras, Paris, France, assignor to Whittaker Corporation, Los Angeles, Calif.
Filed Mar. 19, 1969, Ser. No. 808,399
Int. Cl. B60g *19/04*
U.S. Cl. 280—112                                                                 4 Claims

ABSTRACT OF THE DISCLOSURE

A pneumatic suspension system for a motor vehicle having a pair of laterally spaced road wheels, the system comprising a respective piston-and-cylinder assembly connected between each of the wheels and the vehicle body, each of the assemblies having a cylinder and a triple-acting differential piston slidable in the cylinder and subdividing the same into a first chamber, a second chamber and a third chamber, respective main gas cushions communicating with said first chamber of said assemblies, respective conduit means connecting the second chamber of the assemblies with the third chamber of the other assembly, a pair of auxiliary gas cushions, each connected with a respective one of the conduit means, and a hydraulic distributor responsive to the spacing between the body and the ground surface for modifying the fluid pressure in the chambers to maintain the vehicle height substantially constant.

---

The present invention relates to a hydropneumatic device which is able, at one and the same time, to effect the suspension of a motor vehicle and to ensure that it runs level.

The device is intended to stabilize the vehicle in a transverse and/or longitudinal direction when a rolling movement tends to appear or when swaying occurs on bends.

There are known different hydropneumatic systems which comprise double-acting suspension pistons, of which the oil chambers are connected from one wheel to another by crossed tubing. These known devices all have the disadvantages of not separating the two essential parameters which characterize, one, the flexibility of the suspension, the other, the correction of rolling, or the stabilization. In other terms, the usual devices do not allow the modification of the flexibility of the main suspension without affecting equally the stabilization system.

According to the invention there is provided a pneumatic suspension device for a motor vehicle, the device including respective piston and cylinder assemblies associated with a pair of laterally spaced road wheels, each piston and cylinder assembly having a triple-acting differential piston slidable in a cylinder so that it forms three separate oil chambers, a first chamber which acts on a diaphragm of a main gas cushion, a second chamber and a third chamber, the second chamber of each assembly communicating with the third chamber of the other assembly and with one or another of respective auxiliary gas cushions, the first chamber of each assembly and the communicating pairs of second and third chambers being connected in addition to respective ports of a hydraulic distributor sensitive to variations in the ground clearance of the vehicle so that oil under pressure can be either forced into or released from said chambers to maintain the vehicle substantially at a pre-determined height.

It will be understood that such a device ensures the maintenance of a substantially constant ground clearance of the vehicle whatever may be its load, while a judicious choice of inflation pressures, on the one hand of the main gas cushions and on the other hand of the connecting reservoirs, allows the characteristics of suspension flexibility and those of the stability correction to be regulated independently.

In order that the invention may be fully understood and readily carried into effect, a preferred embodiment thereof will now be described with reference to the accompanying drawing, of which:

FIG. 1 is a schematic view showing in perspective a device according to the invention fitted to an off-side wheel and near-side wheel of the same vehicle, FIG. 2 is a hydraulic diagram of the device, FIG. 3 illustrates the corrections made by the height corrector while the vehicle is runing so long as its static load remains constant, FIG. 4 illustrates the operation of the device when the suspension is in operation, the two wheels being depressed by the same amount, FIG. 5 illustrates the operation of the stability corrector in the case when the near-side wheel alone would have a tendency to be depressed, and FIGS. 6 and 7 show the changes in correction carried out by the height corrector in the case of variation in the static load of the vehicle, when this load increases or decreases.

Referring now to the drawing, a hydro-pneumatic device for suspension and roll correction is fitted to two swinging arms 1 and 2 pivoted on the shell or on the chassis of a motor vehicle by respective shafts 3 and 4. The suspension arm 1 carries a near-side rear wheel 5, whilst the suspension arm 2 is fitted with off-side rear wheel 6.

The arm 1 is fitted with a push-rod 7 of which the top acts upon a cylindrical piston 8. This piston slides while forming a seal within a cylinder 9 which is attached by known means, not shown, to the shell or to the chassis of the vehicle. The top of the cylinder 9 is surmounted by a sealed spherical reservoir 10 within which there is a cushion of gas under pressure 11 separated from the oil in a first chamber 13 by a flexible diaphragm 12.

In the same way, the suspension arm 2 carries a jointed push-rod 14 of which the top acts on a piston 15 which slides forming a seal within a cylinder 16. The latter is attached to the chassis or the shell of the vehicle and it carries at its top a spherical reservoir 17 in which a flexible diaphragm 18 separates a gas cushion 19 and a first oil chamber 20.

There is provided in the central portion of the cylinder 9 a cylindrical zone 21 of enlarged diameter in which slides, likewise forming a seal, an enlarged portion 22 of the piston 8. The piston therefore divides the interior space of the cylinder 9 into three independent oil chambers, namely the first chamber 13, a second chamber 23 situated above the enlarged portion 22 of the piston 8, and a third chamber 24 situated below it.

Similarly the cylinder 16 has a central part of enlarged diameter 25 and an enlarged portion 26 of the piston 15 is slidable in said enlarged portion so that the piston divides the cylinder into chamber 20, second chamber 27, and a third chamber 28.

A length of tubing 29 connects the second oil chamber 23 of the cylinder 9 to the third oil chamber 28 of the cylinder 16. In addition, there is fitted, branching off this tube 29, a pressure reservoir 30 in which the oil in a chamber 31 is separated by a flexible diaphragm 32 from a gas cushion 33 at a pre-determined pressure.

Similarly, a length of tubing 34 connects the third chamber 24 of the cylinder 9 to the second chamber 27 of the cylinder 16, with a branched pressure reservoir 35 divided by a diaphragm 36 into a gas cushion 37 and an oil chamber 38.

In order to complete the suspension and stability correction device, a hydraulic distributor or corrector 39 is employed. The latter is operated by a pivotable arm 40 connected by a connecting-rod 41 to the suspension arm 1. To damp the high frequency suspension vibrations a dash-pot 42 is interposed in the connecting-rod 41.

Six tubes open into the corrector 39, namely:

a tube 43 which connects it to the first chamber 13 of the cylinder 8, a tube 44 which connects it to the first chamber 20 of the cylinder 16, a tube 45 which connects it to the tube 34, a tube 46 which connects it to the tube 29, a feed tube 47 connected elsewhere to an oil pump, not shown, or to any other source of oil under pressure of known type, and a tube 48 communicating with a return circuit, likewise not shown.

The corrector 39 is adjusted so as to make the connection shown in FIG. 3 when the ground-clearance of the vehicle resulting from its static load is fixed at the required amount.

In this case, the tubes 43, 44, 45, 46, 47 and 48 are isolated each from the others.

If, on the other hand, the vehicle settles for some time, that is to say, following an increase of its static load, the corrector 39 carries out the change in connection shown in FIG. 6, in which the return tube 48 remains isolated whilst the four tubes 43, 44, 45 and 46 are connected to the feed tube 47.

Finally, if, on the contrary, the ground clearance of the vehicle increases for some time by reduction of its static load, the corrector 39 operates the connections as shown in FIG. 7. In this case, the four tubes 43, 44, 45 and 46 are connected to the return tube 48 whilst the feed tube 47 remains isolated.

The operation is as follows:

The resilient suspension of the wheels 5 and 6 is ensured by the gas cushions 11 and 19 (FIGS. 2 and 3). This suspension operates simply. Its flexibilty is defined by the characteristics of the gas cushion 11 and 19 when the wheels 5 and 6 are both displaced in the same way while travelling on the road. During this time, the corrector 39 keeps the tubes 43, 44, 45, 46, 47 and 48 isolated, as shown in FIG. 3.

It will be seen that if the piston 8 is driven upwardly relative to its cylinder as shown by the arrow 49 (FIG. 4) while the piston 15 moves in the same sense by the same amount (arrow 50), the oil expelled from the chamber 23 flows to the chamber 28, while the oil displaced from the chamber 27 flows to the chamber 24. This transfer of oil is effected without the reservoirs 30 and 35 being brought into play.

If, on the other hand, the wheels 5 and 6 are acted upon by different forces (FIG. 5), for example the piston 8 having a tendency to be displaced in the direction of the arrow 51, while the piston 15 tends to remain motionless, it will be seen that the oil expelled from the chamber 23 by the enlarged portion of the piston 8 acts at the same time on the lower face of the enlarged portion 26 of the piston 15 (oil chamber 28) and on the gas cushion 33 of the reservoir 30. Similarly, the increase in volume of the lower chamber 24 of the piston 8, causes an extraction of oil from the intermediate chamber 27 of the piston 15, whilst the gas cushion 37 of the reservoir 35 tends to expand.

It will be seen that, by the difference of oil pressures, the piston 15 is caused to be displaced in the same direction as the piston 8 (arrow 52) the characteristics of this anti-roll effect being defined mainly by the careful design of the reservoirs 30 and 35 principally as regards the volume and the pressure of their gas cushions 33 and 37.

It will be seen that the device may replace the torsion anti-roll bar of conventional suspension systems. In addition, it allows the response characteristics of the anti-roll system to be regulated at will by carefully adjusting the oil pressures, and so, in consequence, those of the different gas cushions 11, 19, 33 and 37.

In addition, if the static load of the vehicle is increased, the corrector 39 carries out the changes in connection shown in FIG. 6, that is to say, a supplementary amount of oil under pressure is forced immediately into the four tubes 43, 44, 45 and 46n which re-establishes the ground clearance.

Conversely, if the vehicle is unloaded, the corrector 39 temporarily operates the change in connection shown in FIG. 7, when the tubes 43, 44, 45 and 46 are connected to the return tube 48, to maintain the vehicle at the predetermined height.

In brief, the ground-clearance of the vehicle is substantially constant whatever the static load.

Various modifications may be made without departing from the scope of the invention. For example, the suspension arrangement described above could equally well be applied to the front wheels of a vehicle and has been described as applied to the rear wheels by way of example only. Furthermore, the connecting-rod 41 could have been attached to the suspension arm 2 instead of to the arm 1. Any other type of dashpot may be interposed in the connecting-rod.

I claim:

1. A pneumatic suspension system for a motor vehicle having a pair of laterally spaced road wheels, said system comprising a respective piston-and-cylinder assembly connected between each of said wheels and the vehicle body, each of said assemblies having a cylinder and a triple-acting differential piston slidable in said cylinder and subdividing the same into a first chamber, a second chamber and a third chamber; respective main gas cushions communicating with said first chamber of said assemblies; respective conduit means connecting the second chamber of each of said assemblies with the third chamber of the other assembly; a pair of auxiliary gas cushions, each connected with a respective one of said conduit means; and a hydraulic distributor responsive to the spacing between said body and the ground surface for modifying the fluid pressure in said chambers to maintain the vehicle height substantially constant.

2. The suspension system defined in claim 1, further comprising respective arms swingably mounted to the vehicle body and carrying said wheels, said assemblies being connected to said arms.

3. The suspension system defined in claim 2, wherein said hydraulic distributor is a valve mounted on said body and connected by a pivotal rod to one of said arms.

4. The suspension system defined in claim 3, wherein said rod includes a dash-pot for damping oscillations of said one of said arms.

References Cited
UNITED STATES PATENTS

| | | | |
|---|---|---|---|
| 2,002,249 | 5/1935 | Oyston | 280—112 |
| 2,828,138 | 3/1958 | Grueder | 280—124F |

PHILIP GOODMAN, Primary Examiner

U.S. Cl. X.R.

280—124

UNITED STATES PATENT OFFICE
CERTIFICATE OF CORRECTION

Patent No. 3,606,374             Dated 21 September 1972

Inventor(s) René CAPGRAS

It is certified that error appears in the above-identified patent and that said Letters Patent are hereby corrected as shown below:

In the heading, column 1, between line 7 and 8 read:

-- claims priority, Application France, 2 May 1968, PV 49 974 --  .

Signed and sealed this 15th day of May 1973.

(SEAL)
Attest:

EDWARD M. FLETCHER, JR.
Attesting Officer

ROBERT GOTTSCHALK
Commissioner of Patents